United States Patent [19]

Nishikawa et al.

[11] 4,080,610

[45] Mar. 21, 1978

[54] EXPOSURE-TIME CONTROL SYSTEM HAVING A CLOSED-LOOP CIRCUIT ARRANGEMENT FOR PROVIDING A TIMING CONTROL SIGNAL

[75] Inventors: Yukiyasu Nishikawa, Kawagoe; Takuo Itagaki, Tsurugashima, both of Japan

[73] Assignee: Asahi, Japan

[21] Appl. No.: 683,846

[22] Filed: May 6, 1976

[30] Foreign Application Priority Data

May 14, 1975 Japan .................................. 50-57722

[51] Int. Cl.² .............................................. G03B 7/08
[52] U.S. Cl. .................................. 354/23 D; 354/24; 354/50; 354/60 A; 354/60 L
[58] Field of Search .................. 354/23 D, 24, 50, 51, 354/60 R, 60 A, 60 L

[56] References Cited

U.S. PATENT DOCUMENTS

| | | | |
|---|---|---|---|
| 3,899,788 | 8/1975 | Toyoda | 354/23 D |
| 3,988,069 | 10/1976 | Kitavra | 354/23 D |
| 3,995,284 | 11/1976 | Kitavra et al. | 354/50 |

Primary Examiner—Russell E. Adams
Attorney, Agent, or Firm—Christie, Parker & Hale

[57] ABSTRACT

A closed-loop circuit arrangement sequentially operates in a tracking mode before the shutter of a single lens reflex camera is actuated, and then in a holding mode after the shutter is actuated. The circuit arrangement receives from a conventional photoelectric circuit a first analog signal that instantaneously represents exposure time so long as light entering the camera impinges on the photoelectric circuit. A register in the circuit arrangement provides a digital multi-bit signal that is converted to a second analog signal. The first and second analog signals are compared to produce an error signal used during the tracking mode in controlling the register so that the digital multi-bit signal varies until the first and second analog signals represent the same exposure time. After the shutter is actuated, the register serves as a memory thereby causing the second analog signal to statically represent exposure time.

9 Claims, 5 Drawing Figures

EXPOSURE-TIME CONTROL SYSTEM HAVING A CLOSED-LOOP CIRCUIT ARRANGEMENT FOR PROVIDING A TIMING CONTROL SIGNAL

BACKGROUND OF THE INVENTION

In general, this invention relates to a system for controlling the exposure time of a shutter of a single lens reflex (SLR) camera. More particularly, it relates to an improved system including a closed-loop circuit arrangement that provides an analog signal used by a timing circuit to control exposure time.

In an SLR camera, light entering the camera through the lens can follow one of two paths. While the photographer is composing the picture, the light is reflected by a mirror toward a focusing screen to form an image for viewing through a viewfinder. When the photographer actuates the shutter button to take a picture, the mirror pivots so that the light is focused at the film plane.

The displacement of the mirror so that it is out of the way of the film has the result that the light does not impinge on the focusing screen while the shutter is being opened and closed. In an SLR camera having a through-the-lens (TTL) exposure control system, the photocell thereof is positioned so as to be responsive to the light entering the camera when the mirror is down, and accordingly neither receives light nor produces a useful signal while the shutter is being opened and closed. Because of this, and further because a timing circuit in the exposure control system requires a tiiming-control signal after the shutter is actuated, it is essential to provide a storage or memory function.

One conventional arrangement for providing this memory function employs a capacitor as a signal storing element. Usually, in an effort to minimize the decay of the voltage stored by the capacitor, a high input impedance field effect transistor stage (FET) is provided as a buffer between the capacitor and the timing circuit.

This conventional arrangement has several disadvantages. In operation, the stored value will vary with time because of leakage currents of the capacitor and the FET. Maufacturing problems also arise, particularly with respect to the selection of elements and strict tolerances therefor, and also with respect to mechanical problems involved in water-proofing of the circuitry involved. Further, there has been a serious problem in prior art cameras in which an ammeter serves as the exposure meter display. In particular, an ammeter is not sufficiently shock resistant, and its reliability may accordingly be deteriorated in use.

Various proposals have heretofore been made to overcome these problems with respect to storage and display. For example, it has been proposed that an analog signal representing exposure time be converted into a corresponding digital value to be stored in flip-flop circuitry, and that this digital value be displayed by a display element such as a light emitting diode, a liquid crystal, or a small electric lamp. Most of the analog-to-digital (A-D) converters thus proposed use counters in which the respective count values are directly associated with the exposure time. With these prior art A-D converters, there have usually been encountered two problems. One of these problems relates to resolving power. With a quantization unit of, for example, one ms, as many as 1000 different intermediate values may be taken between 1S and 2S, whereas no intermediate value may be taken between 1ms and 2ms. The other problem relates to response velocity. The response time is remarkably different relative to variations in exposure time and even at an identical ratio. For example, consider the variation in time from 1ms to 2ms and the variation from 1S to 2S. The response time relative to the latter case is 1000 times as long as the response time relative to the former case. Furthermore, a complex decoder has usually been required in such a circuit to obtain the output necessary for display. It should be noted here that, although it would be possible to take intermediate values even between 1ms and 2ms, by increasing the number of stages the counter, whereby the unit of quantization is made more fine, the previously mentioned problems remain unsolved and the circuit arrangement is correspondingly complicated.

SUMMARY OF THE INVENTION

The present invention is embodied in a system for controlling the exposure time of a shutter of an SLR camera. Viewed from one aspect, the invention is characterized by the provision of closed-loop circuit means for sequentially operating initially in a tracking mode of operation before the shutter is actuated, and then in a holding mode after the shutter is actuated. Generally, operation in a tracking mode occurs while a picture is being composed. During this time, a conventional photoelectric circuit means in the system responds to light entering the camera by producing a first analog signal instantaneously representing exposure time. Operation in the holding mode occurs while a picture is being taken. During this time, a conventional timing circuit means in the system requires, in order to control exposure time, an analog or timing-control signal which, like the first analog signal, represents exposure time.

The closed-loop circuit means broadly comprises register means; digital-to-analog (D/A) converter circuit means; comparator circuit means; and digital circuit means. The register means provides a digital multi-bit signal to the D/A converter means which responds thereto to produce a second analog signal. The comparator circuit means responds to the first and second analog signals by producing an error signal. The digital circuit means responds to the error signal by providing pulses. To this end, the digital circuit means includes a pulse generator for generating pulses, and includes control circuitry connected between the pulse generator and the register means for causing the register means to respond to the pulses during the tracking mode by varying the digital multi-bit signal it provides so as to cause the second analog signal to represent the same exposure time as is instantaneously being represented by the first analog signal. The control circuitry further includes means for inhibiting the pulse generator from causing any variation of the digital multi-bit signal during the holding mode.

From the foregoing it will be appreciated that the digital multi-bit signal provided by the register means varies in accordance with the incoming light until the time of actuation of the shutter. Thereafter, while the shutter is being sequentially opened and closed, the digital multi-bit signal is static. The second analog signal, having a converted value based on this static value, similarly remains static, and it is coupled to the timing circuit means as a timing-control signal.

Viewed from another aspect, certain of the above-recited elements form an interpolating analog-to-digital (A-D) converter. That is, a voltage provided by the photoelectirc circuit means is converted into digital multi-bit format. In the preferred embodiment, the A-D converter includes the pulse generator, and a base nor n-notation reversible or up/down counter together with a bidirectional multistage shift register to make up the register means. Separate fields or portions of the digital multi-bit signal are stored in the counter and the shift register. The shift register field identifies a range, and the counter field identifies a more finely interpolated one of a plurality of values of exposure time within the range.

Other significant features including features of the D-A converter are described in more detail below and brought out in the appended claims.

DETAILED DESCRIPTION

Figure 1:
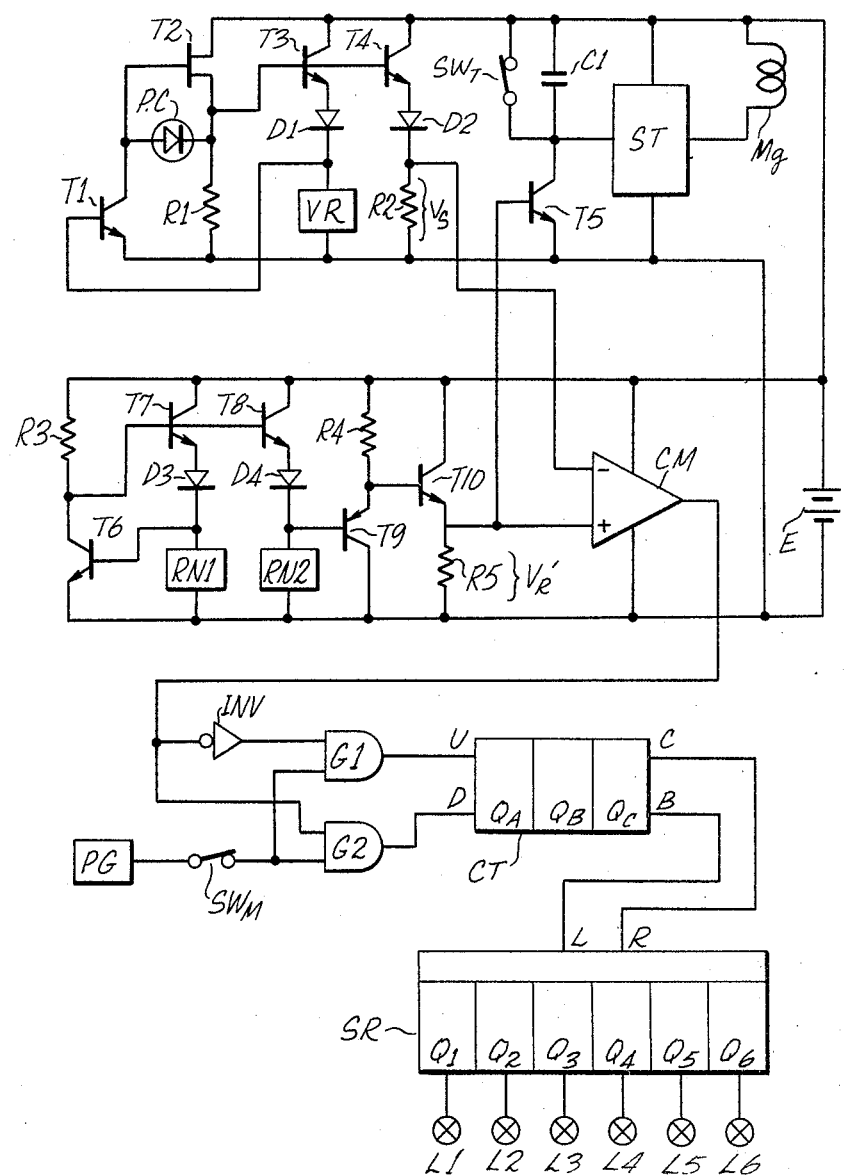
FIG. 1 is a block and schematic diagram illustrating a preferred embodiment of the invention.

The block and schematic diagram of FIG. 1 shows, briefly and generally, the following main sections of an exposure control system for an SLR camera. In its upper left portion, FIG. 1 shows a conventional photoelectric circuit section for producing an analog signal $V_S$. This circuit section includes a photometric circuit having a photocell PC therein, and an operation circuit. To the right of this circuit section there is shown a conventional timer circuit for controlling the operation of a magnet Mg. The middle and lower portions of FIG. 1 show the preferred embodiment of the improvement provided by the present invention.

The middle portion of FIG. 1 shows at the left a digital-to-analog (D/A) section for producing an analog signal $V_R'$, and at the right a comparator CM for producing an error signal in response to the analog signals $V_S$ and $V_R'$. The lower portion of FIG. 1 shows register means comprising an up/down or reversible counter CT and a bidirectional multistage shift register SR. A digital multi-bit signal is accumulated and held in the register means and used as the input signal for the D/A converter section. At the bottom of FIG. 1 there is shown a display section comprising elements L1 through L6.

Consider now in more detail the photometric section. This section includes the photocell PC, a field effect transistor (FET) T2, transistors T1, T3, and T4, a pair of diodes D1 and D2, and the resistors shown connected thereto. Photocell PC is positioned in the light path of the objective. The anode of photocell PC is connected to the collector of transistor T1 whose emitter is connected to the negative electrode of the power source E. The cathode of photocell PC is connected to the gate of FET T2 which is serially connected between the positive electrode of the power source E and the resistor R1. The voltages and currents involved in the operation of this section automatically depend upon the magnitude of a photoelectric current $I_p$ generated in photocell PC.

Preferably, diodes D1 and D2 are made of transistors whose bases and collectors are respectively connected together, and which have equivalent characteristics to the transistors T3 and T4. In this way, the characteristics of diodes D1 and D2 are equal to the base-emitter junction characteristics of the transistors T3 T4, respectively. The same is true with respect to the relationship between diodes D3, D4, and a pair of transistors T7, T8 to be described. Voltages across the bases and emitters of transistors T1, T3, and T4 are designated in this description by $V_A$, $V_B$, and $V_C$. Under the circumstances in which the voltage drops in diodes D1 and D2 are equal to the voltage $V_B$ and $V_C$ across the bases and emitters of the transistors T3 and T4, respectively, then, the terminal voltage $V_S$ may be expressed by $$V_S = V_A + 2(V_B - V_C) \tag{1}$$

It is well known that a voltage drop V(I) occurring when an electric current I flows forward through PN junction may be expressed by $$V(I) = V(I_0) + G \cdot \log_2(I/I_0) \tag{2}$$

where
$G = kT/q \log_e 2$, $k$: Boltzmann's constant,
$T$: absolute temperature,
$q$: electric charge of electron.

Preferably, FET T2 has a negligibly small gate leakage current compared to the photoelectric current $i_p$, and transistor T1 provides a relatively high DC amplification factor. Under these circumstances, the voltage $V_A$ across the base and the emitter of the transistor T1 may be expressed, using the photoelectric current $i_p$ as a variable, by $$V_A(i_p) = V_A(i_{p0}) + G \cdot \log_2\left(\frac{i_p}{i_{p0}}\right) \tag{3}$$

In view of the characteristic of photocell PC, the photoelectric current $i_p$ is proportional to object brightness B, and this brightness B is related to its APEX exponent $B_V$ by $K_1$. $B = 2B_V$, where $K_1$ is a constant. Thus equation (3) may be rewritten, using $B_V$ as a variable, as $$V_A(B_V) = V_A(B_{V0}) + G(B_V - B_{V0}) \tag{4}$$

The voltage $V_B$ across the base and the emitter of transistor T3 depends upon the voltage $V_A$ and a resistance value r of the variable resistance VR as expressed by $$V_B\left(\frac{V_A}{r}\right) = V_B\left(\frac{V_{A0}}{r_0}\right) + \tag{5}$$

$$G \cdot \log_2\left(\frac{V_A}{r} \cdot \frac{r}{V_{A0}}\right) = V_B\left(\frac{V_{A0}}{r_0}\right) +$$

$$G\left\{\log_2\left(1 + \frac{\Delta V_A}{V_{A0}}\right) - \log_2\left(\frac{r}{r_0}\right)\right\} \approx$$

$$V_B\left(\frac{V_{A0}}{r_0}\right) - G \cdot \log_2\left(\frac{r}{r_0}\right)$$

In accordance with conventional practice, the resistance value of variable resistance VR depends upon the APEX exponent $A_V$ of the objective's numerical aperture and the APEX exponent $S_V$ of the film sensitivity in the manner expressed by $$r = r_0 \cdot 2^{\frac{1}{2}\{(A_V - A_{V0}) - (S_V - S_{V0})\}} \quad (6)$$

Equation (5) may be rewritten as $$V_B\left(\frac{V_A}{r}\right) = V_B\left(\frac{V_{A0}}{r_0}\right) - \frac{1}{2}G \cdot \quad (7)$$

$$\{(A_V - A_{V0}) - (S_V - S_{V0})\}$$

The voltage $V_C$ across the base and the emitter of transistor T4 may be expressed, using the voltage $V_S$ as a variable, by $$V_C(V_S) = V_C(V_{S0}) + G \cdot \log_2\left(\frac{V_S}{V_{S0}}\right) \approx V_C(V_{S0}) \quad (8)$$

Substitution of the equations (4), (7) and (8) into equation (1) transforms the latter into $$V_S = G\{(B_V - B_{V0}) - (A_V - A_{V0}) + (S_V - S_{V0})\} + \quad (9)$$

$$V_A(B_{V0}) + 2\left\{V_B\left(\frac{V_{A0}}{v_0}\right) - V_C(V_{S0})\right\}$$

There is established a relationship $$T_V = B_V - A_V + S_V \quad (10)$$

between the APEX exponent $T_V$ of exposure time to provide a correct exposure and the APEX exponent of another exposure factor, so the equation (9) may be reexpressed by $$V_S(T_V) = V_S(T_{V0}) + G(T_V - T_{V0}) \quad (11)$$

Ultimately, the magnitude of voltage $V_S$ depends upon object brightness, the numerical aperture of the objective, and the film sensitivity, and it instantaneously represents in electric analog form the exposure time required to provide a correct exposure. This voltage $V_S$ corresponds to the output of the operation circuit.

Now the timer circuit will be described in more detail. As shown in FIG. 1, the timer circuit comprises a transistor T5, a capacitor C1, a timing switch $SW_T$ and a switching circuit ST. Timing switch $SW_T$ is a normally closed switch adapted to be opened in operative association with opening of the shutter. As the timing switch $SW_T$ is opened, the capacitor C1 is charged by the transistor T5 until its terminal voltage reaches a predetermined value, and then switching circuit ST is activated. This turns off current flow from exciting electromagnet Mg, whereby the shutter closes. There is established a relationship similar to the equation (2) between a collector current $I_C$ of the transistor T5 and a base-emitter voltage $V_{BE}$ thereof and, therefore, the following equation is obtained.

$$I_C = I_{C0} \cdot 2^{\frac{1}{G}(V_{BE} - V_{BE0})} \quad (12)$$

It should be noted here that the collector current or the exposure time $t$ under the condition $I_{CO}: V_{BE} = V_{BEO}$ may be expressed by $$t = k_2 \cdot 2^{-\frac{1}{G}(V_{BE} - V_{BE0})} \quad (13)$$

where $k_2$ is a constant. Accordingly, the output voltage of the previously mentioned operation circuit has the desired magnitude for application to the base of the transistor T5 in order that a correct exposure time is obtained in accordance wih exposure factors including the brightness of an object to be photographed. As it is well known, however, the output of the operation circuit must be stored in a suitable manner in the photograhic camera of TTL light measuring system because photocell PC is out of the light path of the objective immediately before and during each exposure.

Consider now the elements involved in analog-to-digital (A–D) conversion of the analog signal $V_S$ into the abovementioned digital multi-bit signal. Comparator CM has an inverting input terminal (−) which receives the $V_S$ output of said operation circuit. A non-inverting terminal (+) of comparator CM receives the analog signal $V_R'$. The output state of the comparator CM depends upon the relative voltage levels of these analog signals. Its output state is "1" when the voltage applied to the inverting input terminal is less than the voltage applied to the non-inverting input terminal. Its output state is "0" when the former is higher than the latter.

A two-input AND gate G1 has one input connected to the output of an inverter INV whose input receives the output of comparator CM. Another two-input AND gate G2 receives the output of comparator CM directly. The other inputs of AND gates G1 and G2 are connected to a conventional camera memory switch $SW_M$ which in turn in connected to the output of a pulse generator PG. Accordingly, one or the other of AND gates G1 and G2 provides at its output counting pulses so long as memory switch $SW_M$ is closed.

Up-down counter CT comprises three stages and provides a first field or portion of the digital multi-bit signal. The first stage $Q_A$ has a significance corresponding to decimal 1, the second stage $Q_B$ has a significance corresponding to decimal 2 and the third stage $Q_C$ has a significance corresponding to decimal 4. Accordingly, counter CT is arranged as octal or 8-notation counter adapted to count between a minimum count of decimal 0 (i.e., stages $Q_A$, $Q_B$, $Q_C$ each store logic "0") and a maximum count of decimal 7 (i.e., stages $Q_A$, $Q_B$, $Q_C$ each store logic "1"). Counter CT has two input terminals U (up) and D (down) and, in addition to a binary coded 3-bit wide count value output, further has two output terminals C (carry) and B (borrow). Upon application of pulses to input terminal U, counter CT counts the pulses in the direction of addition to the previous count value. Upon application of pulses to the other input terminal D, it counts the pulses in the direction of subtraction from the previous count value. In circumstances in which the previous count value is decimal 7, application of a pulse to the input terminal U will bring the count value back to the decimal 0 and at the same time provide a CARRY pulse at output terminal C. Under circumstances in which the previous count value is decinal 0, application of a pulse to the input terminal D will bring the count value back to decimal 7 and simultaneously provide a BORROW pulse at the output terminal B.

Bi-directional multi-stage shift register SR comprises six stages $Q_1$ to $Q_6$ and provides the remaining portion of the digital multi-bit signal. Shift register SR has two input terminals R (right) and L (left). Application of pulses to input terminal R causes a logic state of each stage to be transferred rightward to the next stage, whereas application of pulses to input terminal L causes a logic state of each stage to be transferred leftward to the next stage. It bears mention that the opposite end stages $Q_1$ and $Q_6$ are in effect connected to each other in the same relationship as between each pair of adjacent stages in the intermediate zone in that application of pulses to the input terminal R causes the previous state of the stage $Q_6$ to be directly transferred to the stage $Q_1$ while application of pulses to the input terminal L causes the previous state of the stage $Q_1$ to be directly transferred to the stage $Q_6$. Such a register having this feature is sometimes referred to in the digital art as a recirculating shift register. Upon connection of the source, the states of the respective stages in the bi-directional shift register restore their logic "0" except any one bit remaining at its logic "1" and thereafter they shift rightward or leftward depending upon the pulses applied to the two input terminals R and L as previously mentioned.

The format of the information contained in shift register SR is in accordance with a one out of $m$ code. That is, one stage at a time of shift register SR has a logic "1" stored therein whereas the other stages each have a logic "0" stored therein.

The single one of the $m$ bits that equals logic "1" will be referred to thereafter as the index bit. Display elements $L_1$ to $L_6$ are connected to the outputs of the respective stage of shift register SR. At any given instant, only one display element receives a drive signal for lighting it, that one being the one which is connected to the stage storing the index bit. In some circumstances, the index bit shifts rapidly from one stage to another. Accordingly, owing to persistence, more than one display element will appear to be lit at the same time.

Figure 2A:
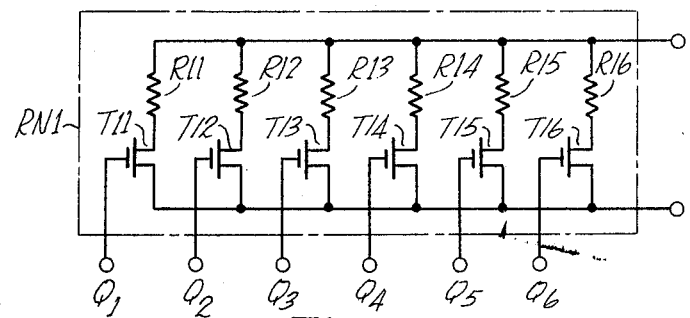
FIG. 2(a) is a circuit diagram illustrating the internal details of the block $RN_1$ of FIG. 1.
Figure 2B:
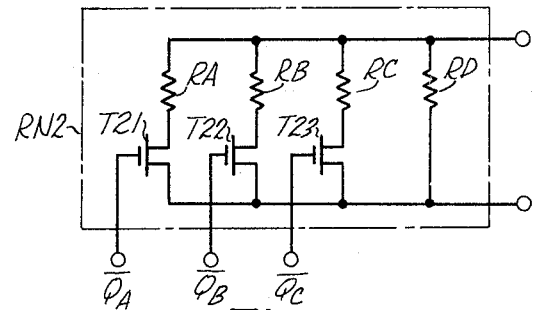
FIG. 2(b) is a circuit diagram illustrating the internal details of the block $RN_2$ of FIG. 2.

The D-A converter section will now be considered. The D-A converter section includes an electric circuit comprising transistors T6, T7, T8, diodes D3, D4, and a resistance R3. Two of the elements of the D-A converter circuit are shown as blocks RN1 and RN2 in FIG. 1, and are shown in detail in FIGS. 2(a) and 2(b). Viewed from one aspect, each of these blocks serves as a digitally-controlled adjustable resistance means for providing a different one of a plurality of discrete resistance values in accordance with the digital control exercised over it. Turning briefly to FIGS. 2(a) and 2(b), it will be seen that each of these blocks includes a group of resistors.

In the D-A converter, adjustment of the resistance value of group RN1 varies the current flowing through transistor T7 and diode D3, and thereby the base potential of transistor T7 also varies. This variation of the base potential of transistor T7 affects transistor T8, diode D4, and a voltage $V_R$ which exists across the group of resistances RN2. Furthermore, this voltage $V_R$ varies also as a function of this resistance value of said group RN2.

The base-emitter voltages of the transistors T6, T7, T8 are herein designated by $V_D$, $V_E$, $V_F$, respectively. Under circumstances in which the voltage drops of the diodes D3 and D4 and equal to base-emitter voltages $V_E$ and $V_F$ of the transistors T7 and T8, respectively, the voltage across the group of resistances RN2 may be expressed by $$V_R = V_D + 2(V_E - V_F) \tag{14}$$

The base-emitter voltage $V_E$ of the transistor T7 may be expressed by $$V_E(r_1) = V_E(r_{10}) - G \cdot \log_2(r_1/r_{10}) \tag{15}$$

where a resistance value $r_1$ of the group of resistances RN1 is used as a variable. Further, the base-emitter voltage $V_F$ of transistor T8 may be expressed, relative to a resistance value $r_2$ and the voltage $V_R$ of the group of resistances RN2 as variables, by $$V_F\left(\frac{V_R}{r_2}\right) = V_F\left(\frac{V_{R0}}{r_{20}}\right) + \tag{16}$$

$$G \cdot \log_2\left(\frac{V_R}{r_2} \cdot \frac{r_{20}}{V_{R0}}\right) = V_F\left(\frac{V_{R0}}{r_{20}}\right) +$$

$$G \left\{\log_2\left(1 + \frac{\Delta V_R}{V_{R0}}\right) - \log_2\left(\frac{r_2}{r_{20}}\right)\right\} =$$

$$V_F\left(\frac{V_{R0}}{r_{20}}\right) - G \cdot \log_2\left(\frac{r_2}{r_{20}}\right)$$

$$\Delta V_R = V_R - V_{R0}$$

As will be explained more fully below, the resistance group RN1 has its resistance value adjusted in response to movement of the index bit of shift register SR and takes a resistance value $r_{1(m)}$ when said index lies in the mth bit $Q_m$. The group of resistances RN1 may be arranged so as to satisfy the following relation:

$$r_{1(m)} = 2^{-1} \cdot r_{1(m-1)} = 2^{-(m-1)} \cdot r_{1(1)} \tag{17}$$

The group of resistances RN2 may be arranged so as to meet the following relation under the similar circumstances in which the resistance value thereof varies according to the count value of counter CT, and the resistance value $r_{2(m)}$ is taken at the count value of "$n$".

$$r_{2(n)} = 2^{-\frac{1}{8}} \cdot r_{2(n+1)} = 2^{\frac{1}{8}(n-7)} \cdot r_{2(7)} \tag{18}$$

with such an arrangement, the equations (15) and (16) may be rewritten as follows:

$$V_E(r_{1(m)}) = V_E(r_{1(1)}) + G(m - 1) \tag{19}$$

$$V_F\left(\frac{V_R}{r_{2(n)}}\right) = V_F\left(\frac{V_{R0}}{r_{2(7)}}\right) - \frac{1}{8} G(n - 7) \tag{20}$$

Substitution of these equations (19) and (20) into the equation (14) gives an equation $$V_R = 2G\left\{(m - 1) + \frac{1}{8}(n - 7)\right\} + \tag{21}$$

$$V_D + 2\left\{V_E(r_{1(1)}) - V_F\left(\frac{V_{R0}}{r_{2(7)}}\right)\right\}$$

Thus, the voltage $V_R$ varies in response to the position of the index "$m$" and the count value "$n$". Designating the voltage $V_R$ appearing in accordance with the index position "$m$" and the count value "$n$" as $V_{R(m,n)}$, said voltage $V_R$ in response to variation of "$m$" and "$n$", in the manner as expressed by $$V_R(m, n + 1) - V_R(m, n) = \tfrac{1}{4}G$$
$$V_R(m + 1, 0) - V_R(m, 7) = \tfrac{1}{4}G$$
$$V_R(m + 1, n) - V_R(m, n) = 2G$$

The variation unit amount of ($\tfrac{1}{4}$) G of this voltage $V_R$ will be indicated as $\Delta$ for simplification in the following description.

An electric circuit, comprising transistors T9, T10 and resistances R4, R5, serves as a buffer circuit to minimize loading effects of transistor T5. Transistor T9 is of the PNP type and the transistor T10 is of the NPN type so that they offset each other in their base-emitter voltages in this buffer circuit. Thus, the voltage $V_R'$ appearing across the resistance R5 is equal to the input voltage $V_R$. As previously mentioned, this voltage $V_R'$ is applied to the non-inverting input of comparator CM and determines, together with the output voltage $V_S$ of the operation circuit, whether the output state of comparator CM equals "1" or "0".

The manner of operation of the A-D converter will now be described.

(a) In the case of $V_S > V_R$:

Output of comparator CM equals logic "0", so that AND gate G1 is opened to transmit pulses applied to it and AND gate G2 is closed. In this case, then, pulses from pulse generator PG are exclusively introduced to input terminal U of counter CT. When each such pulse is applied to input terminal U, the count value "$n$" of counter CT increases to the next higher count value and, accordingly, the voltage $V_R$ increases by $\Delta$ toward the voltage $V_S$. So far as the relationship remains that $V_S > V_R$, application of subsequent pulses to the input terminal U eventually causes the count value to reach the highest possible count value and then recycle to the lowest possible count value, appears at the output terminal C, when the count value so recycles, causing, as a result, the index of the shift register SR to shift rightward by one stage. Also in this case, accordingly, the voltage $V_R$ rises by $\Delta$ toward the voltage $V_S$.

(b) In the case of $V_S < V_R$:

Output of comparator CM equals logic "1", so that AND gate G1 is closed and AND gate G2 is opened. As a result, pulses from pulse generator PG are exclusively introduced to input terminal D of counter CT. Each application of pulse to the input terminal D causes the count value to decrease to the next lower count value and, accordingly, the voltage $V_R$ also drops by $\Delta$ toward the voltage $V_S$. So long as the relationship still remains that $V_S < V_R$, application of subsequent pulses to input terminal D eventually causes the count value to reach the lowest count value and then recycle to the highest possible count value. A BORROW pulse appears at the output terminal B, when the count value so recycles, causing, accordingly, the index of shift register SR to shift leftward by 1 stage. Also in this case, therefore, the voltage $V_R$ drops by $\Delta$ toward the voltage $V_S$.

(c) In the case of $V_s \div V$ :

After the voltage $V_R$ has approached the voltage $V_S$ in the same manner as in the case (a) or (b) and a difference therebetween has reduced to a level lower than $\Delta$, the output of comparator CM is inverted each time the pulses are applied to input terminals U, D of counter CT. At this moment when the output of comparator CM so oscillates, the output voltage $V_R'$ comes in coincidence with the output voltage $V_S$ with an error which is smaller than the quantized error $\Delta$, and the count value "$n$" of the counter is now stabilized only with a variation corresponding to "1". It will be appreciated that the above-mentioned oscillation of the output of comparator CM is in effect the null of the error signal. The count value "$n$" and the stage No. "$m$" in which the index is present at this moment constitute the quantized digit of the analog amount $V_S$. At this moment, furthermore, either only one of the display elements L1 to L6 is lit or else two of them which are adjacent to each other are lit.

(d) In the cases of $V > V$ (6, 7) and $V < V$ (L, 0):

The voltage $V_R'$ takes the maximum level when the index of shift register SR is in stage $Q_6$ ($m = 6$) and the count value of counter CT is maximum ($n = 7$). The voltage $V_R'$ takes the minimum level when the index in stage $Q_1$ ($m = 1$) and the count value of counter CT is minimum ($n = 0$). If the voltage $V_S$ is out of this controlled range of the voltage $V_R'$, the operation of the case (a) or (b) is indefinitely repeated.

In the case of $V_S > V$ (6, 7), the index displaces from the first stage $Q_1$ to the sixth stage $Q_6$ in shift register SR and, after the index has reached said sixth stage $Q_6$, the index returns to the first stage $Q_1$. Such a process will be repeated.

In the case of $V_S < V$ (1, 0), the index displaces from the sixth stage $Q_6$ to the first stage $Q_1$ and, after having reached said first stage $Q_1$, returns to said sixth stage $Q_6$. Such a process is repeated. During the process thus repeated, the display elements $L_1$ to $L_6$ are successively lit at intervals which are so short that all the display elements appear dimly lit.

It will be obviously understood that the operation of the A-D converter as mentioned hereinabove is effected even when the voltage $V_S$ varies with time and the voltage $V_R'$ well follows or tracks such a variation of the voltage $V_S$.

Now a relationship between the quantized information ($m$, $n$) and the $T_V$ value will be considered. The terminal voltage of the resistance R2

$$V_S(T_{V0}) = V_A(B_{V0}) + 2\{V_B(\frac{V_{A0}}{r_0}) - V_C(V_{S0})\}$$

as obtained from the equation (9) and (11) under the condition that $T_V = T_{V0}$, may be brought into coincidence with the voltage $$V_R(1, 0) = -\frac{7}{4}G + V_D +$$
$$2\{V_E(r_{1(1)}) - V_F(\frac{V_{R0}}{r_{2(7)}})\}$$

as obtained from the equation (21) on the condition that $m = 1$ and $n = 0$ by properly selecting the resistance values of the resistances R2, R3 and the reference resistance values $r_{1(1)}$, $r_{2(7)}$ of the resistance groups RN1, RN2. With the reference value $T_{V0}$ of the $T_V$ value being set to "$-2$", the T value and the quantized information (M, $n$) may be mutually related as expressed by $$T_V = 2(m + n/8 - 2)$$

As obviously understood from the aforegoing description, this A-D converter roughly quantizes the analog amount $T_V$, first, by the index position "$m$" of the shift register and then finely quantizes the intermediate portions among the discrete values by the counter value "n" of the counter so as to effect the desired interpolation.

Figure 4:
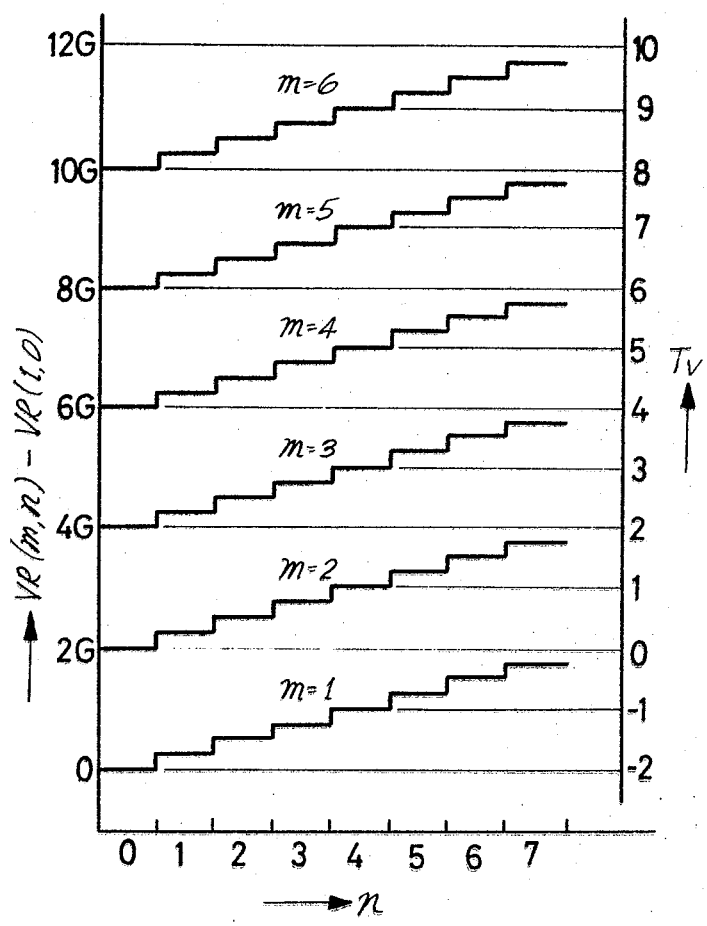
FIG. 4 is a diagram illustrating with respect to the preferred embodiment the relationship between the quantized information provided by the counter CT and the shift register SR, and the APEX system $T_V$ value.

FIG. 4 illustrates the index position "m" and the count value "n" set as previously mentioned with respect to the voltage $V_R$ and the $T_V$ value.

The diodes D1 to D4 are not critical in the embodiment as described hereinabove. These diodes are utilized in this embodiment to reduce the resistance value ranges of the variable resistance VR and the resistance groups RN1, RN2.

When it is desired to omit the diodes. D1 to D2, the resistance value progressions of the variable resistance VR and the resistance groups RN1, RN2 may be set as geometric progressions respectively having common ratios of 2, $2^2$ and $2^{\frac{1}{2}}$. When said diodes D1 to D4 are replaced by pairs of serially connected diodes, respectively, the resistance value progressions of the variable resistance VR and the resistance groups RN1, RN2 may be set as geometric progressions respectively having common ratios of $2^{\frac{1}{2}}$, $2^{\frac{1}{3}}$ and $2^{1/12}$ thereby the variable resistance VR and the resistance groups RN1, RN2 of smaller resistance value ranges than in the embodiment herein described may be used. Furthermore, the function equivalent to that of the two-direction shift register in the embodiment may be obtained by a combination of a 6-notation reversible counter and a decoder.

The manner in which the resistance groups RN1 and RN2 are arranged in practice will now be described. Reference symbols T11 to T16 and T21 to T23 designate transistors of MOS type serving merely as switches.

First of all, the group of resistances RN1 will be considered. The respective gates of the transistors T11 to T16 are connected to the outputs of respective stages $Q_1$ to $Q_6$ of shift register SR. Accordingly, only the transistor connected to the index bit is conductive. By selecting respective resistance values $r_{11}$, $r_{12}$, $r_{13}$, $r_{14}$, $r_{15}$ and $r_{16}$ of the individual resistances R11 to R16 according to the relationship.

$$r_{11} = 2r_{12} = 4r_{13} = 8r_{14} = 16r_{15} = 32r_{16},$$

the group of resistances RN1 satisfying the relation as expressed by the equation (17) may be obtained.

Consider now the group of resistances RN2. The respective gates of the transistors T21 to T23 are connected to the inverted outputs $\overline{Q_A}$, $\overline{Q_B}$, $\overline{Q_C}$ of the count value outputs $Q_A$, $Q_B$, $Q_C$ of counter CT. Accordingly, at the count value of "0", all the transistors T21 to T23 are conductive and the resistance value of the resistance group RN2 corresponds to the parallel resistance value of the resistances RA, RB, RC, RD. At the counter value of "1", the transistor T21 is non-conductive while the transistors T22, T23 are conductive, so that the resistance value of the resistance group RN2 corresponds to the parallel resistance value of the resistances RB, RC, RD. As the count value further increases, the output states of the transistors T21 to T23 successively vary and the resistance value of the resistance group RN2 rises until all the transistors T21 to T23 will be non-conductive at the count value of decimal 7, so that the resistance value of the resistance group RN2 will be equal to the resistance value of the resistance group RD. With the individual resistances RA, RB, RC, RD taking their resistance values $r_A$, $r_B$, $r_C$, $r_D$, the respective resistance values are selected so as to satisfy the relationship as expressed by $$r_A // r_D = 2^{-\frac{1}{8}} \cdot r_D$$

$$r_B // r_D = 2^{-\frac{1}{4}} \cdot r_D$$

$$r_C // r_D = 2^{-\frac{1}{2}} \cdot r_D$$

$$r_A = 11.05 r_D$$

$$r_B = 5.29 r_D$$

$$r_C = 2.41 r_D$$

The expression $r_A // r_D$ represents the resistance value of the parallelly connected resistances RA and RD and the third place of decimals in each number is counted as one fraction of more than 0.5 inclusive and the rest is cut away, the resistance group RN2 approximately meeting the relationship as expressed by the equation (18) may be obtained.

To realize the relationship of the equation (18) faithfully, the decoders are connected to counter CT outputs $Q_A$, $Q_B$, $Q_C$ to obtain outputs decimal "0" to "7" in combination with eight transistors and resistances to constitute the resistance group RN2 in the same manner as in the embodiment of the resistance group RN1 illustrated in FIG. 2(a).

Consider now the overall operation in connection with the sequence in which the photographic camera is operated.

(i) Slight depression of the camera shutter button (not shown) causes the source switch (not shown) to be closed and thereby the electric circuit is connected to the power source. An index is generated in shift register SR at the initial stage of said depression. At this moment, the memory switch $SW_M$ and the timing switch $SW_T$ still remain closed. Accordingly, the pulses from the pulse generator PG are applied to counter CT and the A-D converter is activated. Then, the output voltage of the D-A converter section comes in coincidence with the output voltage of the operation circuit, so that the counter value of the counter and the index position of the shift register are determined. A single one or an adjacent pair of the display elements is or are lit depending upon the index position, informing the user of the correct exposure time at this moment. When the display L5, for example, is lit, the exposure time at this moment lies between 1/60 sec and 1/250 sec and, when the display elements L4 and L5 are lit, the exposure time at this moment lies just on 1/60 sec. When all the display elements L1 to L6 are dimly lit, it is meant that the desired correct exposure time is out of the controllable range of this control circuit and the user may adjust the objective aperture until one or an adjacent pair of the display elements L1 to L6 will be lit.

(ii) Further depression of the shutter button by the user after visually confirming the state in which the display elements are lit leads, first, to opening of the memory switch $SW_M$, then to regulation of the lens aperture and to changing-over of the light path from the photometric side to the photographic side. The opening of memory switch $SW_M$ inhibits further change of the digital multi-bit signal in that pulses of the pulse generator PG are prevented from being transmitted. Thus, counter CT and shift register SR are held at their then existing states. The light is intercepted from the photocell PC, and the output of the operation circuit loses its significance. Despite this, the voltage equivalent to the output of the operation circuit as immediately before the memory switch $SW_M$ is opened is preserved via the analog signal $V_4'$.

(iii) After said changing-over of the light path to the photographing side, the shutter is opened and synchronously the timing switch $SW_T$ also is opened. This enables capacitor Cl to begin charging with the collector current of transistor T5, this collector current corresponding to the output voltage $V_R'$. When the terminal voltage of capacitor Cl reaches a predetermined value, the switching circuit ST is activated to cut off the current which has been applied to the electromagnet Mg and thereby to close the shutter. In this manner, a correct exposure is assured according to the brightness of an object to be photographed.

In the embodiment hereinabove described, the range ($-2 \leq T < 10$) is divided into six ranges, each including a pair of steps, said six ranges being associated with the respective stages of the shift register. Further, an intermediate portion between each pair of steps is eight-divided at intervals corresponding to ¼ step in association with the respective states of the 8-notation counter for interpolation. As a whole, the range ($-2 \leq T < 10$) is quantized in forth-eight or 48(=8 × 8) stages at intervals each corresponding to ¼ step. However, the present invention is never limited, with respect to the unit of quantization and the allotment of the range, to this embodiment and may be quantized in rather discretionary manners, for example, as following.

(1) When the number of stages of counter CT is increased only by one stage so as to provide a 16-notation counter and the resistance value progression of the resistance group RN2 is set according to the relationship as expressed by $$r_{2(n)} = 2^{-\frac{1}{16}} \cdot r_{2(n+1)} = 2^{\frac{n-15}{16}} \cdot r_{2(15)},$$

it is possible to sixteen-divide each range including two steps at intervals each corresponding to ⅛ step and a further fine interpolation is possible.

(2) When the number of stages of shift register SR is increased only by one stage and the resistance value progression of the resistance group RN1 remains as expressed by the equation (17), the range within which the two-step control is possible may be further enlarged.

(3) When counter CT and shift register SR remain as illustrated by FIG. 1 and the resistance value progressions of the resistance groups RN1, RN2 are set according to the relationships as expressed, respectively, by $$r_{1(m)} = 2^{-\frac{1}{2}} \cdot r_{1(m-1)} = 2^{-\frac{1}{2}(m-1)} \cdot r_{1(1)}$$

$$r_{2(n)} = 2^{-\frac{1}{16}} \cdot r_{2(n+1)} = 2^{\frac{1}{16}(n-7)} \cdot r_{2(7)},$$

the range alloted to each stage of the shift register corresponds to one step which is, in turn, eight-divided at intervals each corresponding to ⅛ step for interpolation. On the assumption that the minimum value of the controllable range in this embodiment is set as $T_V = 4$, the maximum value thereof will be as $T_V = 10$. Although the controllable range is thus reduced, the unit of display may be correspondingly made fine and the error of quantization also may be reduced.

Figure 3:
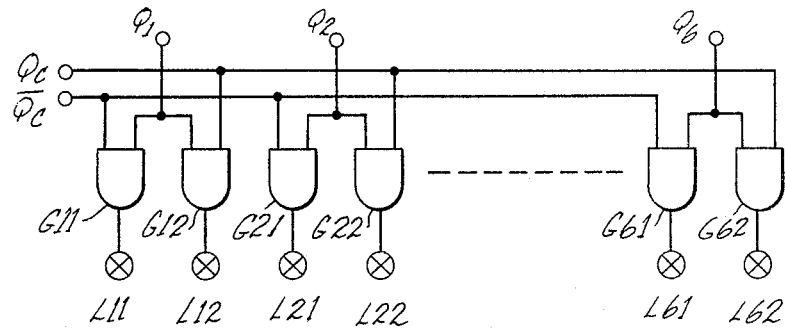
FIG. 3 is logic block diagram illustrating an alternative embodiment of the display section.

FIG. 3 illustrates a method by which the unit of display may be made fine by addition of a simple circuit without reduction of the controllable range. Reference symbols G11, G12, G61, G62 designate AND gates and reference symbols L11, L12 and L61, L62 designate display elements. Input signals Q1, Q2 . . . Q6 on one side of each AND gate correspond to outputs from the respective stages of shift register SR shown in FIG. 1 and input signals QC, QC on the other side correspond to the third stage QC and the complementary output QC thereof of counter CT. With this arangement, the display element L11 is lit within the range ($-2 \leq T < -1$), the display element L12 is lit within the range ($-1 \leq T < 0$). In such a manner, the display element L21 is lit within the range ($0 < T < 2$), the display element L22 is lit within the range ($1 \leq T < 2$), and the display element L62 is lit within the range ($9 \leq T < 10$). The A-D converter according to the present invention provides thus the output signals suitable for displaying.

The A-D converter having the interpolating function as mentioned above may respond in a predetermined time to variation of the signal at a predetermined ratio so that intermediate values at regular intervals may be taken in a logarithmic range, achieve the desired displaying without use of any decoder and be realized with a relatively compact circuit.

Furthermore, there may be provided the electric shutter having the display means of high reliability adapted to display the correct exposure time which may vary from moment to moment and the memory function adapted to maintain the memory value permanently so long as the power source is connected, by use of said A-D converter in the electric shutter control circuit.

What is claimed is:

1. In a system for controlling the exposure time of a shutter of a single lens reflex camera, the system having photoelectric circuit means that, before the shutter is actuated, responds to light entering the camera by producing a first analog signal instantaneously representing exposure time, and having timing circuit means that requires such an analog signal after the shutter is actuated in order to control the exposure time, the combination comprising:

closed-loop circuit means for sequentially operating initially in a tracking mode of operation before the shutter is actuated, and then in a holding mode after the shutter is actuated;

the closed-loop circuit means comprising:

register means for providing a digital signal, the register means including an up/down counter providing a first portion of the digital signal, and a reversible shift register providing the remaining portion of the digital signal, the first portion of the digital signal being encoded in binary format and having n possible values, the remaining portion of the digital signal being encoded in a one out of m code having m possible values, each of the m possible values representing a respective one of a plurality of ranges of exposure time and each of the n possible values representing a respective one of a plurality of interpolation points within such a range; digital-to-analog converter circuit means responsive to the digital signal for producing a second analog signal; comparator circuit means responsive to the first and second analog signals for producing an error signal; digital circuit means responsive to the error signal fo providing pulses, the digital circuit means including a pulse generator for generating pulses, and control circuitry connected between the pulse generator and the register means for causing the register means to respond to the pulses during the tracking mode by varying the digital signal it provides so as to cause the second analog signal to represent the same exposure time as is instantaneously being represented by the first analog signal; the control circuitry including means for inhibiting the pulse generator from causing any variation of the digital signal during the holding mode; and means for coupling the second analog signal to the timing circuit means.

2. The combination of claim 1 wherein the control circuitry includes gating circuit means for providing counter-input pulses to the up/down counter; the up/down counter has a carry output and a borrow output; and the shift register has a pair of opposite shift pulse inputs respectively connected to the carry output and borrow output.

3. The combination of claim 1 wherein the digital-to-analog converter circuit means includes first digitally-controlled adjustable resistance means connected to the shift register to respond to said remaining portion of the digital signal by providing a different one m discrete resistance values for each of the m possible values; second digitally-controlled adjustable resistance means connected to the up/down counter to respond to the first portion of the digital signal by providing a different one of n discrete resistance values for each of the n possible values; and circuit means for producing the second analog signal as a function of the resistance values provided by the adjustable resistance means.

4. The combination of claim 3 wherein the digital-to-analog converter circuit means includes first and second log compression elements respectively connected in series with the first and second adjustable resistance means; wherein the discrete resistance values provided by the first adjustable resistance means differ from each other in accordance with a geometric progression; and wherein the discrete resistance values provided by the second adjustable resistance means differ from each other in accordance with a geometric progression.

5. The combination of claim 1 wherein the means for inhibiting includes a camera memory switch connected to the pulse generator for preventing pulses generated thereby from being coupled to the register means.

6. The apparatus of claim 1 wherein the comparator circuit means includes a differential input circuit providing as the error signal a voltage that oscillates between opposite binary values in null error signal conditions.

7. In a system for controlling the exposure time of a single lens reflex camera, the system having photoelectric circuit means that, before the shutter is actuated, produces a first voltage instantaneously representing exposure time, and having timing circuit means that requires such a voltage after the shutter is actuated in order to control the exposure time, the combination comprising;

an interpolating A-D converter, which includes
a pulse generator;

a base n reversible counter having addition and subtraction inputs for having addition and substraction inputs for counting pulses received on said addition and subtraction inputs and including means for providing a carry pulse and a borrow pulse;

a bidirectional multi-stage shift register having an index bit stored therein, the shift register shifting the index bit rightward and leftward from stage to stage upon application of a carry pulse and a borrow pulse from the reversible counter;

a D-A converter section for providing a second voltage, and including a first resistor group providing a composed resistance value which varies in accordance with particular stage occupied by the index bit, and a second resistor group providing a composed resistance value which varies in accordance with a particular count value of the base n reversible counter, the D-A converter section being adapted to achieve a proper interpolation according to a particular count value of the base n reversible counter through n-division of discrete values depending upon various positions occupied by the index bit;

a pulse allotment control section including means for comparing the first and second voltages, and means for allotting pulses from the pulse generator to the addition and subtraction inputs of the reversible counter to cause the second voltage to be brought into coincidence with the first voltage; and a memory switch adpated to be operatively associated with shutter release to intercept transmission of pulses from the pulse generator to the reversible counter; and means for coupling the second voltage to the timing circuit means.

8. The combination of claim 7 wherein said A-D converter comprises a combination of a first resistor group of which the composed resistance value varies in the manner of a geometric progression with a common ration of $2^a$ (where a represents a constant) according to a particular position occupied by the index of the shift register, a second resistor group of which the composed resistance value varies in the manner of a geometric progression with a common ratio of $2^{a/n}$ according to a particular count value of the base n reversible counter; and first and second log-compression elements connected in series with said first resistor group and said second resistor group, respectively, for conversion of electric currents flowing therethrough depending upon the resistance values of the respective resistor groups into voltages proportional to the associated electric currents, so that discrete values depending upon various positions occupied by the index of the shift register are properly interpolated according to the count value of the base n reversible counter.

9. The combination of claim 7 wherein finely divided ranges of controlled exposure time are successively associated with the respective stages of the shift register, and separate display elements are connect to each stage of the shift register so that the everchanging correct exposure time is displayed at each moment.

* * * * *

UNITED STATES PATENT AND TRADEMARK OFFICE
CERTIFICATE OF CORRECTION

PATENT NO. : 4,080,610
DATED : March 21, 1978
INVENTOR(S) : Yukiyasu Nishikawa et al.

It is certified that error appears in the above-identified patent and that said Letters Patent are hereby corrected as shown below:

Column 4, line 6, "T3T4" should read -- T3, T4, --; column 4, line 56, "$\frac{r}{V_{A0}}$)" should read -- $\frac{r_0}{V_{A0}}$) --.

Column 6, line 47, after "as" insert -- an --.
Column 12, line 5, at the margin, insert -- or --.
Column 13, line 2, "$V_4$'" should read -- $V_R$' --.
Column 14, line 12, "(0 < T < 2)" should read -- (0 < T < 1) --;
column 14, line 68, "fo" should read -- for --.
Column 16, lines 1, 2, 3, after "having addition and subtraction inputs for" delete -- having addition and subtraction inputs for --; column 16, line 43, "ration" should read -- ratio --.

Signed and Sealed this

*Thirty-first* Day of *October 1978*

[SEAL]

Attest:

RUTH C. MASON
*Attesting Officer*

DONALD W. BANNER
*Commissioner of Patents and Trademarks*